(12) United States Patent
Schildberger

(10) Patent No.: US 10,323,685 B2
(45) Date of Patent: Jun. 18, 2019

(54) BEARING ARRANGEMENT FOR A TILTABLE CONVERTER

(71) Applicant: Aktiebolaget SKF, Gothenburg (SE)

(72) Inventor: Alfred Schildberger, Ternberg (AT)

(73) Assignee: Aktiebolaget SKF, Göteborg (SE)

( * ) Notice: Subject to any disclaimer, the term of this patent is extended or adjusted under 35 U.S.C. 154(b) by 0 days.

(21) Appl. No.: 16/026,753

(22) Filed: Jul. 3, 2018

(65) Prior Publication Data

US 2019/0024709 A1   Jan. 24, 2019

(30) Foreign Application Priority Data

Jul. 21, 2017   (DE) .................. 10 2017 212 584

(51) Int. Cl.
| | |
|---|---|
| *F16C 33/66* | (2006.01) |
| *F16C 19/10* | (2006.01) |
| *F16C 33/60* | (2006.01) |
| *F16C 35/04* | (2006.01) |
| *F16C 35/077* | (2006.01) |
| *F16C 23/08* | (2006.01) |
| *F16C 19/26* | (2006.01) |

(52) U.S. Cl.
CPC .............. *F16C 19/10* (2013.01); *F16C 23/08* (2013.01); *F16C 33/60* (2013.01); *F16C 33/6659* (2013.01); *F16C 35/047* (2013.01); *F16C 35/077* (2013.01); *F16C 19/26* (2013.01); *F16C 2361/65* (2013.01)

(58) Field of Classification Search
CPC ..... F16C 23/08; F16C 33/6659; F16C 35/047
See application file for complete search history.

(56) References Cited

U.S. PATENT DOCUMENTS

| | | | |
|---|---|---|---|
| 3,427,081 A | 2/1969 | Dellinger | |
| 3,523,714 A | 8/1970 | Puhringer | |
| 3,897,120 A * | 7/1975 | Riegler | C21C 5/464 |
| | | | 384/482 |
| 3,901,566 A * | 8/1975 | Riegler | C21C 5/464 |
| | | | 384/145 |
| 4,092,053 A * | 5/1978 | Riegler | C21C 5/50 |
| | | | 266/245 |
| 4,132,452 A * | 1/1979 | Riegler | C21C 5/50 |
| | | | 266/91 |

FOREIGN PATENT DOCUMENTS

DE   102005012601 A1   9/2006

* cited by examiner

*Primary Examiner* — Thomas R Hannon
(74) *Attorney, Agent, or Firm* — Bryan Peckjian; SKF USA Inc. Patent Dept.

(57) ABSTRACT

A non-locating bearing arrangement for supporting one side of a trunnion ring of a converter. The arrangement provides a toroidal roller bearing mounted in a split housing having top and bottom halves, an inner ring of the bearing mounted to a trunnion of the trunnion ring and an outer ring of the bearing mounted to a bore in the housing. A first spacer ring mounted in axial abutment between a first side part of the housing an opposing end face of the outer bearing ring; a second spacer ring mounted in axial abutment between a second side part of the housing and an opposing end face of the outer bearing ring. The first spacer ring has an axial width greater than an axial width of the second spacer ring, and the protrusion has a plane of symmetry that is parallel to and axially offset from the housing center plane.

4 Claims, 3 Drawing Sheets

BEARING ARRANGEMENT FOR A TILTABLE CONVERTER

CROSS-REFERENCE

This application claims priority to German patent application no. 102017212584.5 filed on Jul. 21, 2017, the contents of which are fully incorporated herein by reference.

TECHNOLOGICAL FIELD

The present invention relates to the field of rolling element bearings and is more particularly directed to a bearing arrangement for supporting one side of a tiltable converter, which allows for axial displacement of the bearing relative to its housing.

BACKGROUND

Converters used in steel production are typically supported in a trunnion ring that has first and second trunnions at opposite sides of the ring, whereby each trunnion is rotationally supported via a bearing arrangement. One of the trunnions is connected to a drive gear for tilting the trunnion ring and converter, to enable molten metal within the converter to be poured out. As is generally known, the trunnion at the driven side is supported by a locating bearing arrangement, while the trunnion at the non-driven side is supported by a non-locating bearing arrangement, which allows for expansions and contractions of the trunnion ring, relative to fixed supports. The bearing arrangement also needs to accommodate high radial loads and angular misalignments.

An example of such a non-locating bearing arrangement, or expansion bearing arrangement, is disclosed in U.S. Pat. No. 3,523,714. The arrangement comprises a double-row spherical roller bearing mounted in a housing. An inner ring of the bearing is fixedly mounted on the trunnion via a conical clamping sleeve, while an outer ring of the bearing is mounted to the housing via a slidable cylindrical sleeve that permits axial displacement of the bearing relative to the housing. The arrangement further comprises a protective bushing made of harder material than the slidable sleeve, which is mounted to the housing bore and provides the sliding surface for the slidable sleeve. Furthermore, anti-rotation means in the form of axial grooves and fitting keys are provided to prevent rotation of the slidable sleeve relative to the bushing, and circumferential grooves are provided to permit introduction of a lubricant.

In alternative solution, a toroidal roller bearing such as a CARBO bearing sold by SKF is used in the non-locating bearing arrangement. This type of bearing can withstand high radial loads, accommodate angular misalignments and has the advantage of permitting relative axial displacement between the inner and outer bearing rings. The use of a toroidal roller bearing therefore removes the need for an additional component such as a slidable sleeve. In some applications, however, the amount of relative axial displacement permitted by the toroidal roller bearing may be insufficient or may become insufficient over time, due to deformation of the trunnion ring.

There is still room for improvement.

SUMMARY

The present invention resides in a non-locating bearing arrangement for supporting one side of a trunnion ring of a converter. The arrangement comprises a toroidal roller bearing mounted in a split housing, which has a top half and a bottom half. An inner ring of the bearing is fixedly mounted to a trunnion of the trunnion ring. An outer ring of the bearing is mounted to a bore of the housing. To prevent rotation of the outer ring relative to the housing, the arrangement further comprises a locating element, which has a main body part and a protrusion that extends in a radially inward direction. The main body part of the locating element is accommodated within a recess within the housing and has a plane of symmetry that coincides with a centre plane through the housing. The protrusion is adapted to fit in a lubrication hole provided in the outer ring at an axially central location. To fix the axial position of the bearing outer ring relative to the housing centre plane, the bearing arrangement further comprises first and second spacer rings mounted in axial abutment between respective first and second side parts of the housing and opposing end faces of the outer ring. According to the invention, the first and second spacer rings have different axial widths and the protrusion has a plane of symmetry that is parallel to and axially offset from the housing centre plane by an amount y equal to half of the difference in axial width between the first and second spacer rings.

The spacer rings of different width and the asymmetry of the locating element as a whole enables the bearing arrangement to be mounted in two configurations, so that the configuration can be altered if the inner ring and trunnion experience axial displacement in a particular direction that approaches the maximum amount of relative axial displacement between the bearing rings permitted by the design of the toroidal roller bearing. In the altered configuration, additional axial displacement in the particular direction is possible.

Let us assume that displacements in a first axial direction towards a first side of the bearing arrangement are greater in use of the bearing arrangement than displacements in a second, opposite axial direction towards a second side of the arrangement. In the initial configuration, the bearing is mounted such that the wider spacer ring is arranged at the first side of the bearing, such that a centre plane through the outer ring is axially offset from the housing centre plane in the second direction by the amount y. Now let us assume that due to thermal stresses, the axial position of the trunnion and bearing inner ring shifts in the first direction by an amount that risks damage to the bearing if the shift continues. This might be detected by displacement sensors mounted within the arrangement.

The bearing arrangement is then reconfigured such that the wider of the two spacer rings is located at the second side of the bearing, such that the centre plane through the outer ring is axially offset from the housing centre plane in the first direction by the amount y. Furthermore, the orientation of the locating element is reversed, such that the protrusion is axially offset from the main body part in the first direction. In the altered configuration, the maximum permissible axial displacement of the inner ring in the first direction is increased by an amount equal to 2y.

Preferably, in the initial configuration (prior to any axial displacements due to thermal stresses), the inner ring is mounted with an axial offset in the second direction relative to the outer ring. This increases the permissible amount of axial displacement of the inner ring relative to the outer ring in the first direction.

The locating element acts as an anti-rotation means, and preferably also permits lubricant to be delivered to the outer raceway. Suitably, a lubrication hole is provided through the main body of the locating element and through the protrusion.

To enable easy access to the locating element, so that its orientation can be changed, the recess in the housing which accommodates the main body part is preferably arranged at the location of the housing split. Thus, the recess has a first section located in the bottom half of the housing and a second section located in the top half of the housing. In an embodiment, the first and second sections of the recess are equal in size, each section accommodating half of the main body part of the locating element. It is also possible for the recess to be fully located in the bottom half of the housing or in the top half.

A bearing arrangement according to the invention permits straightforward reconfiguration in order to accommodate increased axial displacements.

The invention will now be described in further detail with reference to the accompanying drawings.

DETAILED DESCRIPTION

Figure 1:
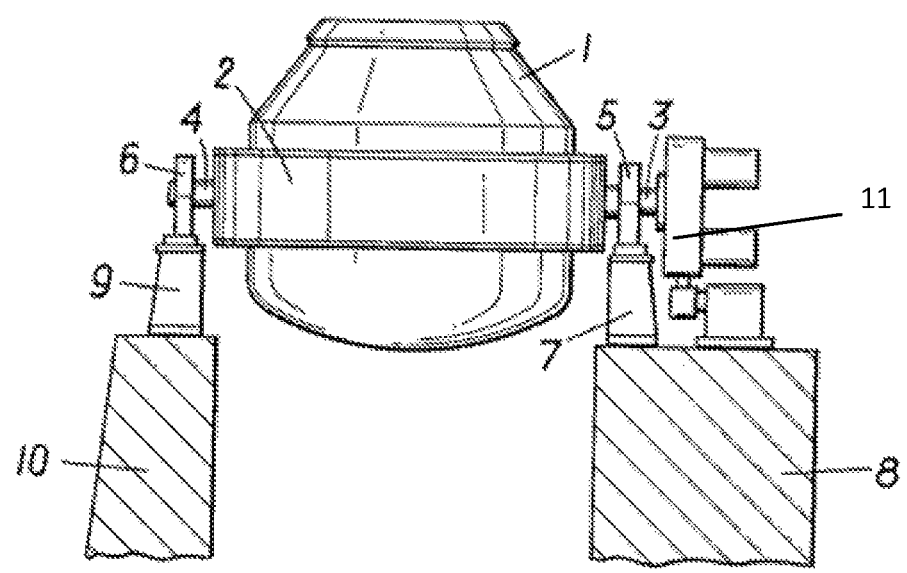
FIG. 1 shows a general view of a converter and supporting structure.

A side view of a converter and its supporting structure is shown in FIG. 1. The converter 1 is supported in a trunnion ring 2 which has first and second trunnions 3, 4 at respective first and second sides of the ring. The first trunnion 3 is rotationally supported relative to a fixed stand 7 via a first bearing arrangement 5. The second trunnion 4 is rotationally supported relative to a fixed stand 9 via a second bearing arrangement 6. The fixed stand 9 at the second side rest on a foundation 10. The fixed stand 7 at the first side rests on a foundation 8, which additionally supports a drive means 11 that is coupled to the first trunnion 3. Rotation of the first trunnion 3 tilts the trunnion ring 2 and converter 1, enabling its contents to be poured out.

In use of the converter 1, oxygen is blown into carbon-rich molten pig iron contained within a vessel of the converter, which lowers the carbon content in order to obtain low-carbon steel. The converter 1 may be dimensioned to hold up to 400 tons of iron and the temperatures within the vessel reach around 1700° C. Despite refractory lining of the vessel, the trunnion ring 2 and trunnions 3,4 experience temperature rises that cause thermal expansion in an axially outward direction. In addition, at the location near a pouring lip of the converter, the trunnion ring can experience localized heating during pouring that causes its circular shape to become somewhat oval, which is referred to as ovalization. This leads to a contraction in an axially inward direction.

The first and second bearing arrangements 5,6 which support the trunnion ring 2 and converter 1 must therefore be able to withstand high radial loads and accommodate axial displacements in both axial directions, which is achieved via a locating/non-locating bearing arrangement. The first bearing arrangement 5 at the first, "driven" side of the trunnion ring is the locating bearing, which provides axial location of the first trunnion 3 relative to the fixed stand 7. Suitably, the locating bearing arrangement comprises a self-aligning bearing such as a double-row spherical roller bearing, to accommodate misalignment of the trunnion relative to the bearing axis. The second bearing arrangement 6 at the second, "non-driven" side is the non-locating bearing arrangement, which accommodates the above-mentioned axial displacements.

In reality, the actual amount of axial displacement that needs to be accommodated is difficult to predict with accuracy, particularly the displacements associated with ovalization of the trunnion ring. Typically, the axial displacements are monitored using e.g. sensors. It can happen that the permitted amount of relative axial displacement in a particular direction proves to be insufficient. According to the invention, the non-locating bearing arrangement 6 comprises a toroidal roller bearing and has a first configuration and a second configuration, which permits greater axial displacement of the bearing inner ring in a desired direction than in the first configuration. When it is detected that the amount of permitted relative axial displacement in the first configuration is nearing its limit, the bearing arrangement of the invention can be mounted in the second configuration in a straightforward manner.

Figure 2:
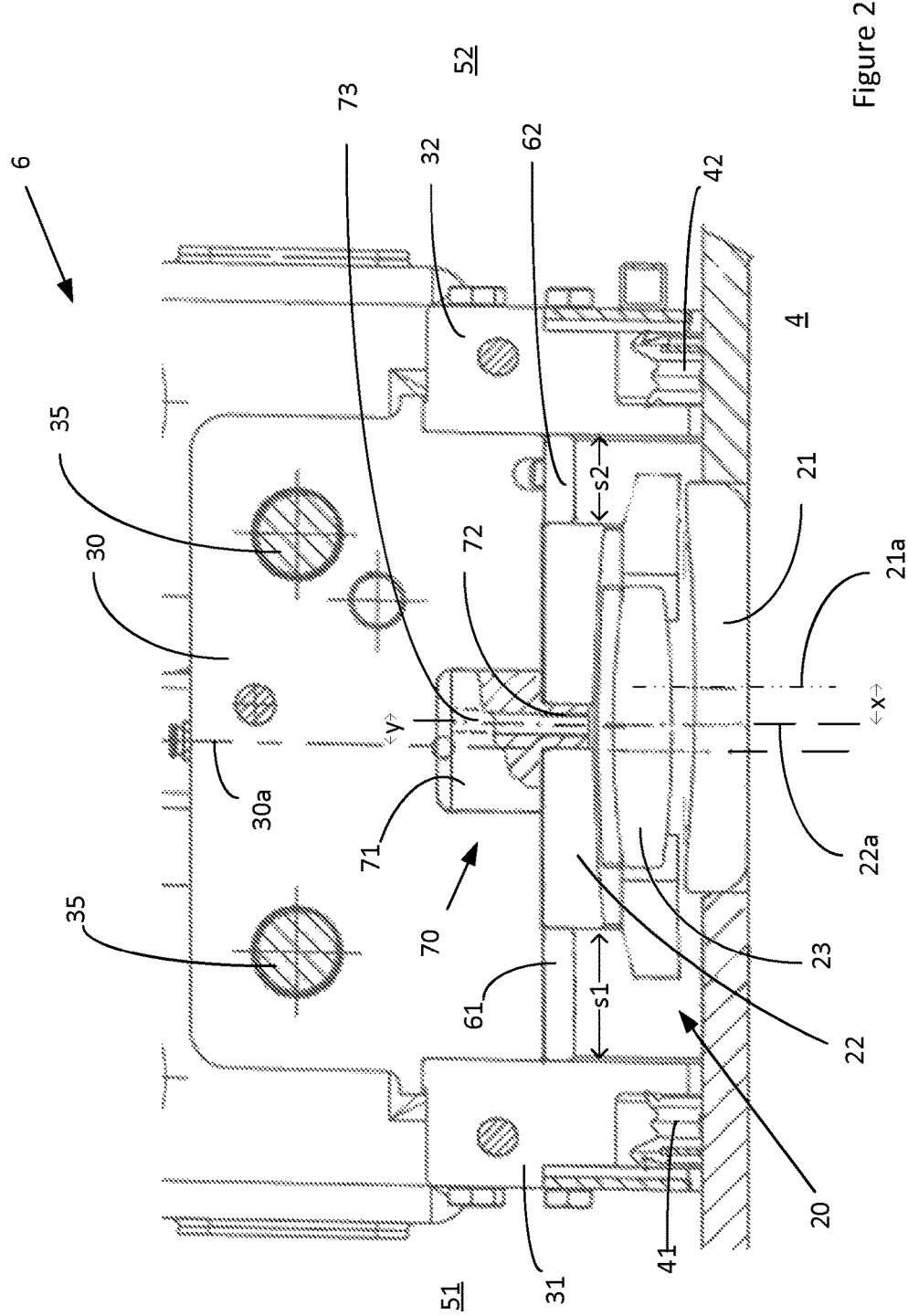
FIG. 2 shows a cross-section of part of a non-locating bearing arrangement according to the invention, for supporting one side of the converter shown in FIG. 1, mounted in a first configuration.

An example of part of a non-locating bearing arrangement according to the invention, mounted in the first configuration, is shown in FIG. 2 in cross-section. As mentioned, the arrangement 6 comprises a toroidal roller bearing 20 which has an inner ring 21 with a toroidal inner raceway, an outer ring 22 with a toroidal outer raceway and a row of toroidal rollers 23 disposed between the raceways. The inner ring 21 is fixedly mounted to the second trunnion 4, and will follow any axial displacements of the trunnion towards a first side 51 of the arrangement and towards a second side 52 of the arrangement. The outer ring 22 is mounted to a housing 30, which is a split housing having a top half and a bottom half, whereby the cross-sectional view shown in FIG. 2 is taken along the plane of the split. The housing halves can be joined together via bolt connections 35. The housing further comprises first and second side parts 31, 32 which accommodate respective first and second seals 41, 42 for sealing an annular gap between the trunnion 4 and the housing at each axial side.

The toroidal roller bearing 20 is self-aligning and also permits relative axial displacements between the inner ring 21 and the outer ring 22. Let us assume that when a center plane 22a though the outer ring 22 (in radial direction of the bearing) is in alignment with a center plane 21a through the inner ring 21, the bearing 20 is dimensioned and has sufficient radial clearance to permit a relative axial displacement of 60 mm in both axial directions. Displacements towards the first side 51 of the bearing arrangement 6 will be referred to as displacements in the first direction; displacements towards the second side 52 of the arrangement will be referred to as displacements in the second direction. Let us further assume that displacements of the trunnion 4 due to ovalization of the trunnion ring occur in the first direction, while displacements due to thermal expansion occur in the second direction. In general, it is expected that the displacements in the first direction due to ovalization will be larger than the displacements in the second direction.

Consequently, it is beneficial to mount the bearing inner ring 21 with an axial offset x relative to the outer ring 22 in the second direction, such that permitted relative axial displacement in the first direction increases to 60+x mm and the permitted relative axial displacement in the second direction decreases to 60−x mm. Note: in FIG. 2, the inner ring 21 is shown in initial mounting condition, when no axial displacements of the trunnion 4 have occurred due to thermal effects.

The axial position of the bearing outer ring 22 is fixed relative to a center plane 30a through the housing 30 by means of first and second spacer rings 61, 62. The first spacer ring 61 is mounted in abutment with the first side part 31 of the housing and the opposing end face of the outer ring 22. The second spacer ring 62 is mounted in abutment with the second side part 32 of the housing and the opposing end face of the outer ring 22. In accordance with the invention, the first spacer ring 61 has an axial width s1 which is greater than an axial width s2 of the second spacer ring. This enables the position of the outer ring 22 relative to the housing center plane 30a to be changed in a straightforward manner, if the permitted amount of displacement of the inner ring 21 in the first direction approaches its limits. This will be explained in more detail later.

In the first configuration, the wider of the two spacer rings 61 is mounted at the first side 51 of the arrangement; the narrower of the two spacer rings 62 is mounted at the second side 52. The center plane 22a through the outer ring is thus offset from the housing center plane 30a in the second direction by an amount y, whereby $y=(s1-s2)/2$.

The arrangement 6 further comprises a locating element 70, which prevents rotation or creep of the outer ring 22 relative to the housing 30 and which permits lubricant to be delivered to the outer raceway and the roller set. The locating element 70 has a main body part 71 and a protrusion 72 which fits into a lubrication hole provided in the outer ring 22, thereby acting as an anti-rotation means. The main body part 70 is accommodated in a correspondingly shaped recess in the housing 30, whereby a first section of the recess is formed in the bottom half of the housing and a second section of the recess is formed in the top half of the housing.

According to the invention, the main body part 71 of the locating element 70 has a plane of symmetry (in radial direction of the bearing) which coincides with the housing centre plane 30a, while the protrusion 72 has a corresponding plane of symmetry that is axially offset therefrom. In the first configuration, the protrusion 72 is axially offset from the main body part 71 in the second direction, by the amount y.

The locating element 70 further has a lubrication hole 73 that extends through the main body part 71 and the protrusion 72 and which is in communication with the outer raceway. A hole axis of the lubrication hole 73 in the locating element coincides with a hole axis of the lubrication hole provided in the outer ring 22.

The locating element 70 is designed to facilitate straightforward reconfiguration of the bearing arrangement, which will be explained further with reference to FIG. 3, which shows the non-locating bearing arrangement in the second mounting configuration.

Figure 3:
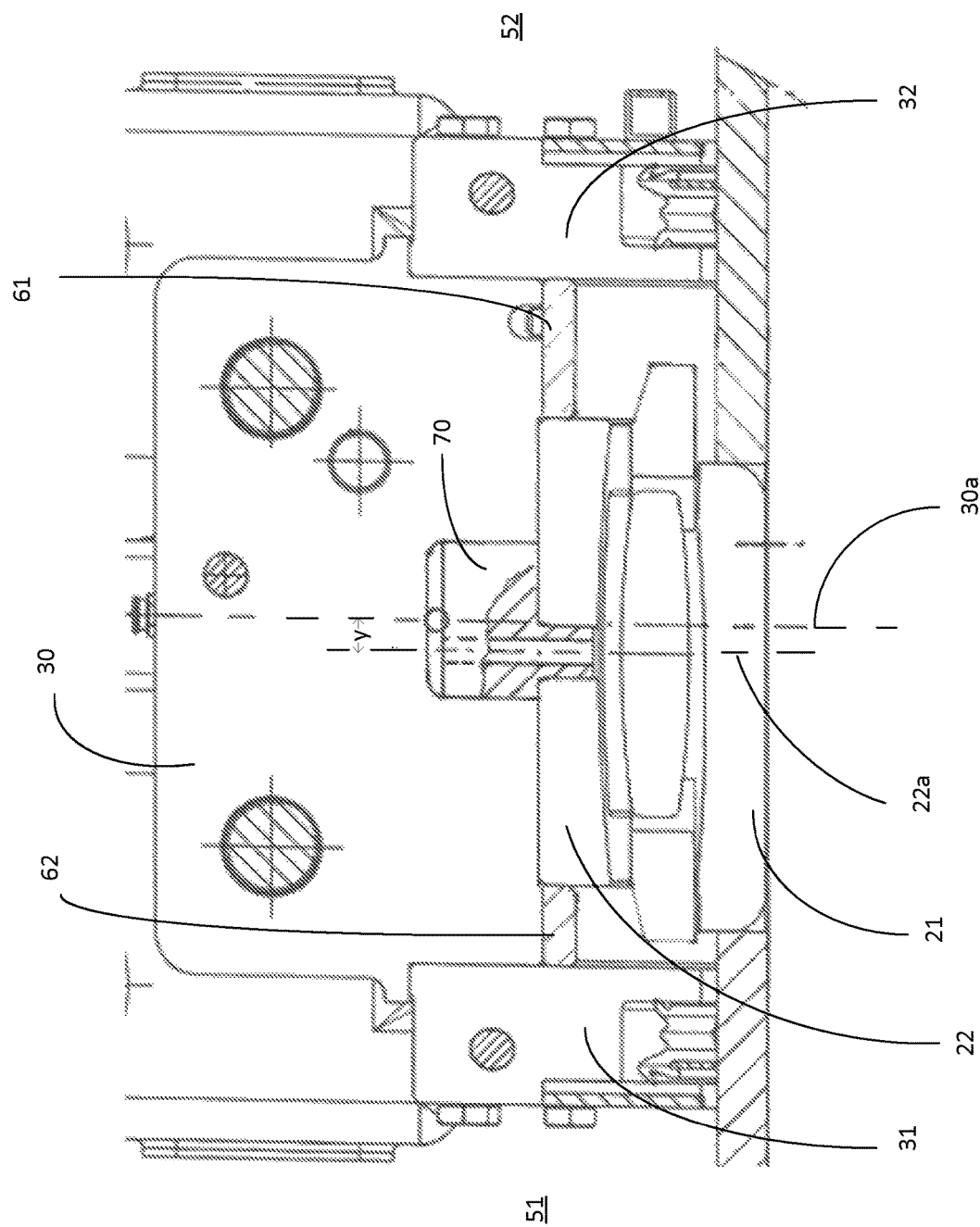
FIG. 3 shows the bearing arrangement from FIG. 2 mounted in a second configuration.

Let us assume that the trunnion 4 and inner ring 21 have experienced axial displacement towards the first side 51 of the arrangement, as shown in FIG. 3, by an amount that is close to the maximum displacement permitted in the first mounting configuration shown in FIG. 2. To increase the amount of permitted axial displacement in the first direction, and thereby prevent damage to the bearing, the bearing arrangement is reconfigured as shown in FIG. 3.

The top part of the housing 30 is removed and the trunnion 4 and bearing 20 are lifted. Further, the locating element 70 is removed and the position of the first and second spacer rings is exchanged, such that the first spacer ring 61 (wider) is located at the second side 52 of the arrangement and the second spacer ring 62 (narrower) is located at the first side 51. This locates the outer ring 22 closer to the first side part 31 of the housing, such that the outer ring center plane 22a is now axially offset relative to the housing center plane 30a in the first direction, by the amount y. Due to the asymmetry of the locating element 70, its orientation can be changed. The locating element is repositioned in the recess in the lower part of the housing, with the protrusion 72 axially offset from the housing centerline 30a in the first direction. Finally, the trunnion and bearing are replaced, with the outer ring repositioned to allow for extra displacement, and the top half of the housing 30 is bolted back on.

In the first mounting configuration, the maximum permissible axial displacement of the inner ring in the first direction was equal to 60+x mm. In the second mounting configuration, the corresponding maximum permissible axial displacement has increased to 60+x+2y mm. The non-locating bearing arrangement of the invention thus permits straightforward reconfiguration in order to permit greater axial displacement of the bearing inner ring in the desired direction.

As will be understood, the invention is not restricted to the described embodiment, but may be varied within the scope of the accompanying claims.

What is claimed is:

1. A non-locating bearing arrangement for supporting one side of a trunnion ring of a converter, the arrangement comprising:
    a toroidal roller bearing mounted in a split housing having a top half and a bottom half,
    an inner ring of the bearing is fixedly mounted to a trunnion of the trunnion ring,
    an outer ring of the bearing is mounted to a bore of the housing,
    a first spacer ring is mounted in axial abutment between a first side part of the housing an opposing end face of the outer bearing ring,
    a second spacer ring is mounted in axial abutment between a second side part of the housing and an opposing end face of the outer bearing ring, and
    a locating element having a main body part and a protrusion, the main body part is accommodated within a recess within the housing and has a plane of symmetry that coincides with a center plane through the housing and the protrusion is adapted to fit in a lubrication hole provided in the outer ring at an axially central location, wherein
    the first spacer ring has an axial width greater than an axial width of the second spacer ring, and wherein
    the protrusion has a plane of symmetry that is parallel to and axially offset from the housing center plane by an amount equal to $(s1-s2)/2$.

2. The bearing arrangement according to claim 1, wherein a first section of the recess that houses the main body part of the locating element is located in the bottom half of the housing and a second section of the recess is located in the top half of the housing.

3. The bearing arrangement according to claim 1, wherein the locating element comprises a lubrication channel in communication with an outer raceway of the bearing outer ring.

4. The bearing arrangement according to claim 1, wherein in an initial mounting configuration such that the trunnion has not experienced any deformation due to thermal stresses, the bearing inner ring is arranged with an axial offset relative to the bearing outer ring.

* * * * *